Nov. 6, 1945. H. SCHMIDT 2,388,343
SMUT REMOVER AND GRAIN CLEANER
Filed Aug. 31, 1943 2 Sheets-Sheet 2

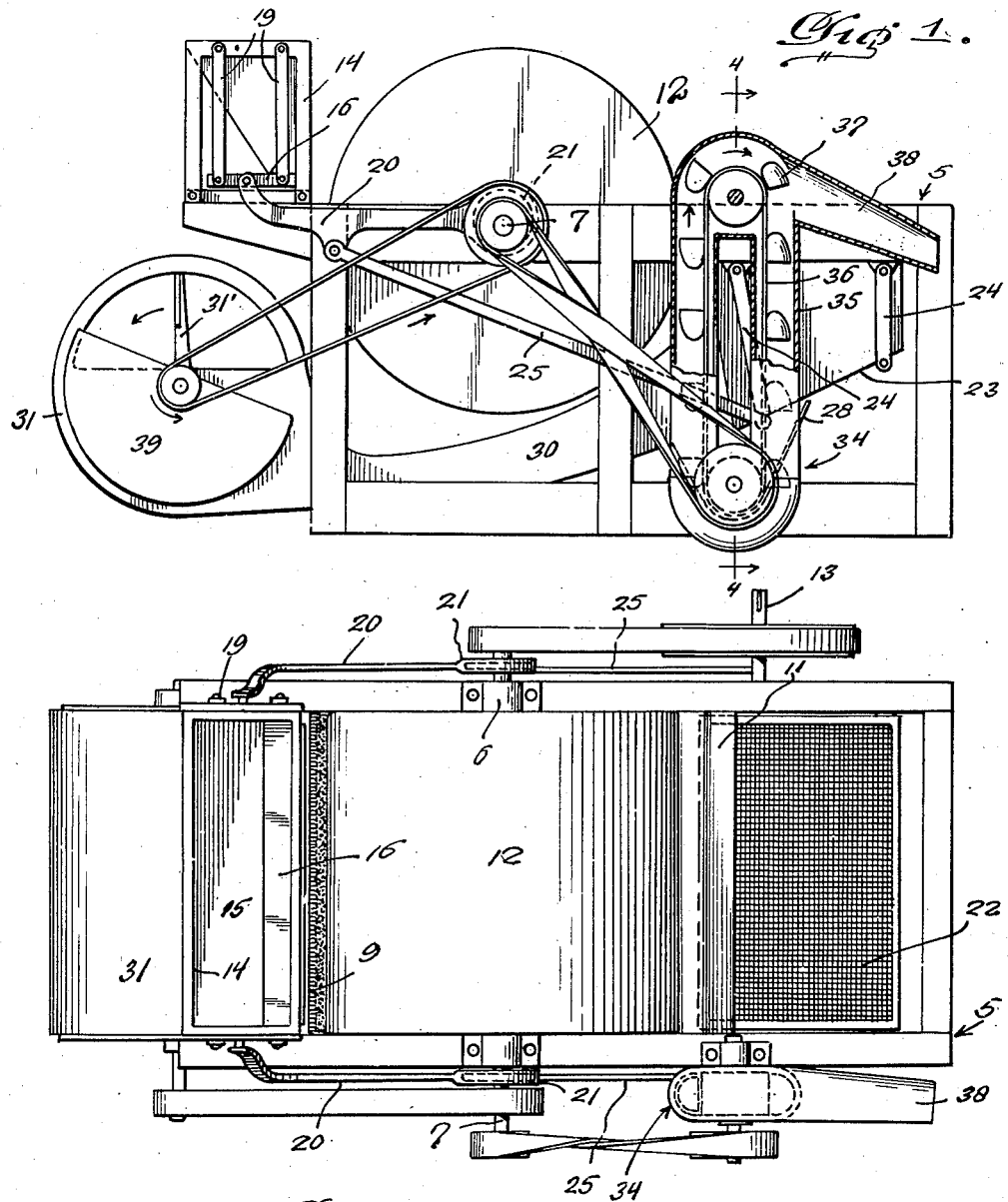

Inventor
Henry Schmidt,
By McMorrow and Berman
Attorneys

Patented Nov. 6, 1945

2,388,343

UNITED STATES PATENT OFFICE 2,388,343

SMUT REMOVER AND GRAIN CLEANER

Henry Schmidt, Forsyth, Mont.

Application August 31, 1943, Serial No. 500,690

2 Claims. (Cl. 83—36)

This invention relates to smut removers and grain cleaners and more particularly to a device for removing smut and other foreign material which may adhere to various kinds of grain.

The primary object of the invention is the provision of a device of the above stated character which will be extremely simple to operate and will efficiently loosen foreign material from the grain and then remove said foreign material from the grain without damage thereto and then deliver the cleaned grain in such a way that handling or sacking thereof may be easily carried out.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a smut remover and grain cleaner constructed in accordance with my invention.

Figure 2 is a top plan view illustrating the device.

Figure 3:
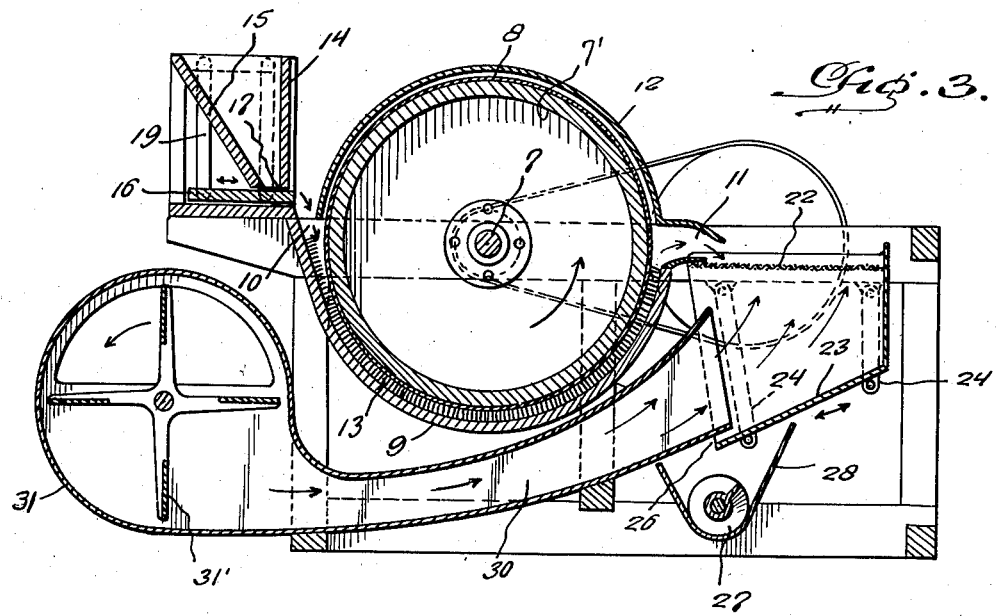
Figure 3 is a vertical sectional view illustrating the device.
Figure 4:
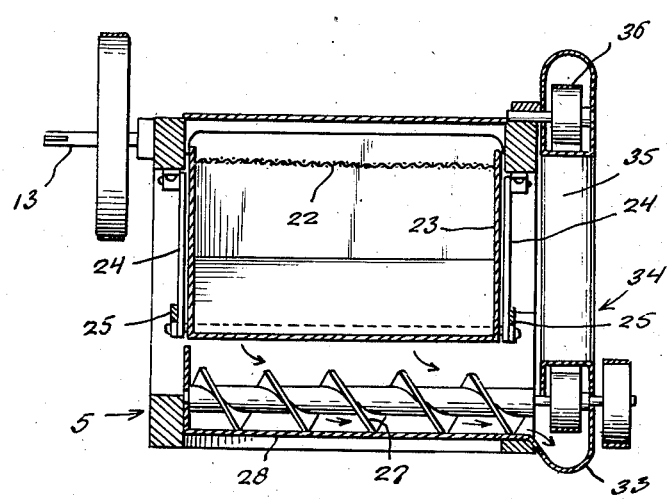
Figure 4 is a transverse sectional view taken on the line 4—4 of Figure 1.
Figure 5:
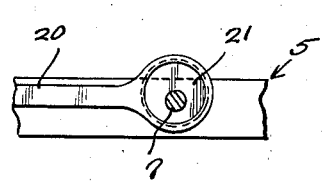
Figure 5 is a fragmentary view partly in section illustrating a cam and its pitman.

Referring in detail to the drawings, the numeral 5 indicates a support of the skeleton frame type and is provided with bearings 6 to rotatably support a main shaft 7 transversely of said support and substantially intermediate its ends and to which is secured a drum 7', the periphery of which is equipped with a covering 8 of cushion material. A concave 9 underlies the drum and is supported by the frame and provided with a receiving end 10 and a discharge end 11. The upper half of the drum is overlaid by a guard 12. The concave 9 is provided with small teeth or bristles 13 which have wiping contact with the covering during the rotation of the drum in the direction indicated by the arrow in Figure 3.

The main shaft 7 is belted to a power shaft 13 driven in any suitable manner.

A grain hopper 14 is mounted on one end of the support and includes a sloping wall 15 for directing grain toward the receiving end 10 of the concave. The hopper further includes a horizontally arranged slide 16 underlying the discharge opening 17 of the hopper and spaced a limited distance from the walls thereof. The slide plate is supported by pivoted hangers 19 and has connected thereto pitmans 20 including straps engaging cams 21 secured on the main shaft 7. During the rotation of the main shaft the slide plate is caused to move backward and forward bringing about an agitation of grain and the deliverance of said grain into the receiving end of the concave in a somewhat of an intermittent flow which will prevent the concave from becoming overloaded with grain.

A sieve 22 is mounted on the support at the discharge end 11 of the concave to receive grain therefrom after being acted on by the rotation of the drum in conjunction with the teeth of the concave. The grain delivered from the concave as specified will have foreign matter adhered thereon thoroughly loosened. The sieve 22 is of foraminous material and the size is in accordance with the size of the grain being cleaned, so that the grain may pass through the sieve into a box-like structure 23 carrying the sieve and mounted for swinging movement on the support by pivotal hangers 24. Pitmans 25 (upwardly and forwardly inclined) connect the pitmans 20 to the box-like structure 23 to bring about swinging movement of the latter for agitating the grain on the sieve to bring about the falling of the grain into the box-like structure and which dropped grain may gravitate from the discharge end 26 of the box directly over an auger-type feeder 27 journaled on a supporting structure and operating within a transverse trough 28.

Extending into the box-like structure 23 at the discharge end 26 thereof is a longitudinal air blast pipe 30 connecting to a fan casing 31 mounted on the supporting structure under the hopper and in which operates a fan 31. The blast of air from the fan is delivered into the box-like structure 23 and then through the sieve carrying off the foreign matter loosened and freed from the grain, the clean grain gravitating into the trough 28 and is fed transversely of the supporting structure 5 and into a receiving pit 33 of an elevator 34 carried by the supporting structure and arranged vertically. The elevator 34 includes a housing 35 in which operates an endless belt 36 equipped with buckets 37. The buckets take the grain up from the pit 33 and deliver the same into a discharge spout 38 located at one end of the supporting structure where the grain may be caught in any type of container.

The elevator is belted to the main shaft 7 and also the fan, as clearly shown in Figure 1.

The amount of air entering the fan casing 31 may be controlled by an adjustable damper plate 39 over an opening in the side wall of the casing.

In operation, the grain fed into the concave from the hopper 14 is acted upon by the drum 7' and teeth 13 of the concave 19 to thoroughly loosen any foreign matter adhering to the grain and as the drum rotates in the direction of the arrow in Figure 3, the grain is gradually moved to the discharge end 11 and gravitates therefrom on to the sieve 22. The sieve 22 being in motion by being carried by the box-like structure 23, the grain is caused to fall or gravitate through the sieve into the box-like structure. The air blast traveling through the box-like structure and sieve carries off the loosened foreign material from the grain so that when the grain discharges into the trough 28 it is in a clear state.

The auger conveyor 27 carries the grain to the elevator and the latter discharges the clean grain into the discharge spout 38 for collection in containers.

Thus it will be seen that a very efficient device has been provided which will thoroughly remove all foreign matter from grain without the danger of injuring the grain and will deliver the grain in a clean state readily accessible for sacking or for placing in any type of containers. While this device has been shown and described as a machine in itself, it is to be understood that it can be constructed into a harvester, thresher or similar device.

While I have shown and described the preferred embodiment of my invention, it will be understood that minor changes in construction, combination and arrangement of parts may be made without departing from the spirit and scope of the invention as claimed.

Having thus described my invention, what I claim is:

1. A smut remover and grain cleaner comprising a horizontal support, smut loosening and removing means mounted on a middle portion of the support, a box-like structure mounted for swinging movement on one end portion of the support and having one inner side and top of said box-like structure open and the bottom thereof sloping toward the open side, a horizontal screen covering the top opening of the box-like structure for admitting grain therethrough to the box-like structure after having been previously treated to loosen smut thereon in the said smut loosening and removing means, means for imparting swinging movement to the box-like structure, an air blast means on the support and including a longitudinal discharge conduit extending under said smut loosening and removing means and provided with a flared end extending into the box-like structure and substantially closing the open side of the box-like structure but leaving a space sufficient to permit grain to gravitate from the open side of the box-like structure and past the flaring end of said conduit, a transverse trough located on the support below said box-like structure for receiving grain gravitating from the open side of the box-like structure between the bottom of the latter and the flared end of the conduit, and a vertical conveyor means for carrying the grain off from the trough at one end of the latter to an upper laterally disposed discharge spout.

2. A smut remover and grain cleaner comprising a horizontal support, smut loosening and removing means mounted on a middle portion of the support, said smut loosening and removing means including an arcuate bottom concave whose upper working surface is covered with a bed of closely arranged bristles and a drum mounted rotatably above said concave with its peripheral face covered with a layer of cushion material and traveling in close proximity to the ends of the bristles on said bottom concave, a box-like structure mounted for swinging movement on one end portion of the support and having one inner side and the top of said box-like structure open and the bottom thereof sloping toward the open side, a horizontal screen covering the top opening of the box-like structure for admitting grain therethrough to the box-like structure after having been previously treated to loosen smut thereon in the said smut loosening and removing means, means for imparting swinging movement to the box-like structure, and an air blast means on the support and including a longitudinal air discharge conduit extending under said smut loosening and removing means and provided with a flared end extending into the box-like structure and substantially closing the side of the box-like structure but leaving a space sufficient to permit grain to gravitate from the open side of the box-like structure and past the flared end of said conduit.

HENRY SCHMIDT.